United States Patent [19]

Sandbank et al.

[11] 4,155,733
[45] May 22, 1979

[54] OPTICAL FIBRE MANUFACTURE

[75] Inventors: Carl P. Sandbank; John Irven, both of Bishops Stortford, England

[73] Assignee: International Standard Electric Corporation, New York, N.Y.

[21] Appl. No.: 800,269

[22] Filed: May 25, 1977

[30] Foreign Application Priority Data

Jun. 1, 1976 [GB] United Kingdom ............... 22575/76

[51] Int. Cl.² ............................................. C03B 37/00
[52] U.S. Cl. ..................................... 65/3 A; 65/60 R; 65/86; 65/121; 65/DIG. 7; 427/167; 427/168
[58] Field of Search ................. 65/2, 3 A, DIG. 7, 86, 65/88, 121, 18, 60 R; 427/167, 163, 237

[56] References Cited

U.S. PATENT DOCUMENTS

| | | | |
|---|---|---|---|
| 2,085,245 | 6/1937 | Woods | 65/86 X |
| 2,237,754 | 4/1941 | Davies | 65/60 R |
| 2,433,116 | 12/1947 | Greenbowe et al. | 65/60 R |
| 3,711,262 | 1/1973 | Keck et al. | 65/3 A |
| 3,754,879 | 8/1973 | Phaneuf | 65/3 A X |
| 3,823,995 | 7/1974 | Carpenter | 65/3 A X |
| 3,884,550 | 5/1975 | Maurer et al. | 65/3 A X |
| 4,009,014 | 2/1977 | Black et al. | 427/163 X |

FOREIGN PATENT DOCUMENTS

| | | | |
|---|---|---|---|
| 2531237 | 1/1977 | Fed. Rep. of Germany | 65/3 A |
| 2281330 | 3/1976 | France | 65/3 A |
| 51-20914 | 2/1976 | Japan | 65/13 |
| 51-71313 | 6/1976 | Japan | 65/3 A |

Primary Examiner—Robert L. Lindsay, Jr.
Attorney, Agent, or Firm—John T. O'Halloran; Peter C. Van Der Sluys

[57] ABSTRACT

A continuous flow process is disclosed in which optical fibre is made by a method involving the chemical vapor deposition of material upon the bore of a tube. The tube is fabricated from an annular crucible around a vertical gas feed and is lowered through a hot zone where it is softened and drawn into fibre. The gas deposits one or more layers on the inside of the tube prior to drawing so as to provide the drawn fibre with optical waveguide properties.

13 Claims, 2 Drawing Figures

OPTICAL FIBRE MANUFACTURE

This invention relates to optical fibre manufacture by a method involving the chemical vapour deposition of glass upon the bore of a glass tube.

One process of this type involves depositing several coatings on the bore of a tube while it is rotated in a lathe. The deposition reagents are passed down the tube and caused to react in a localised heated zone of the tube which is heated by a flame or furnace traversed slowly along the tube. Normally a number of traverses are made in order to produce a succession of layers, and then the coated tube is removed from the lathe and its bore collapsed into rod which is drawn into fibre. Such a process is essentially a batch process in which the amount of fibre that can be produced as a single length is limited by the size of tubing that can be accommodated in the lathe.

The present invention is concerned with adapting this process in order to make it possible to produce fibre by a continuous process.

According to the present invention there is provided a method of optical fibre manufacture wherein glass tubing is fabricated around a vertical gas feed which tubing is lowered through a hot zone where it is softened, its bore collapsed and where it is drawn into fibre, and wherein the gas feed is arranged to discharge vapour deposition reagents into the tubing in a zone above the region where the tubing bore is collapsed to deposit upon the bore one or more layers the composition of which is chosen to provide the drawn fibre with optical waveguiding properties.

There follows a description of methods of making glass optical fibre embodying the invention in preferred forms. The description refers to the accompanying drawings in which.

Figure 1:
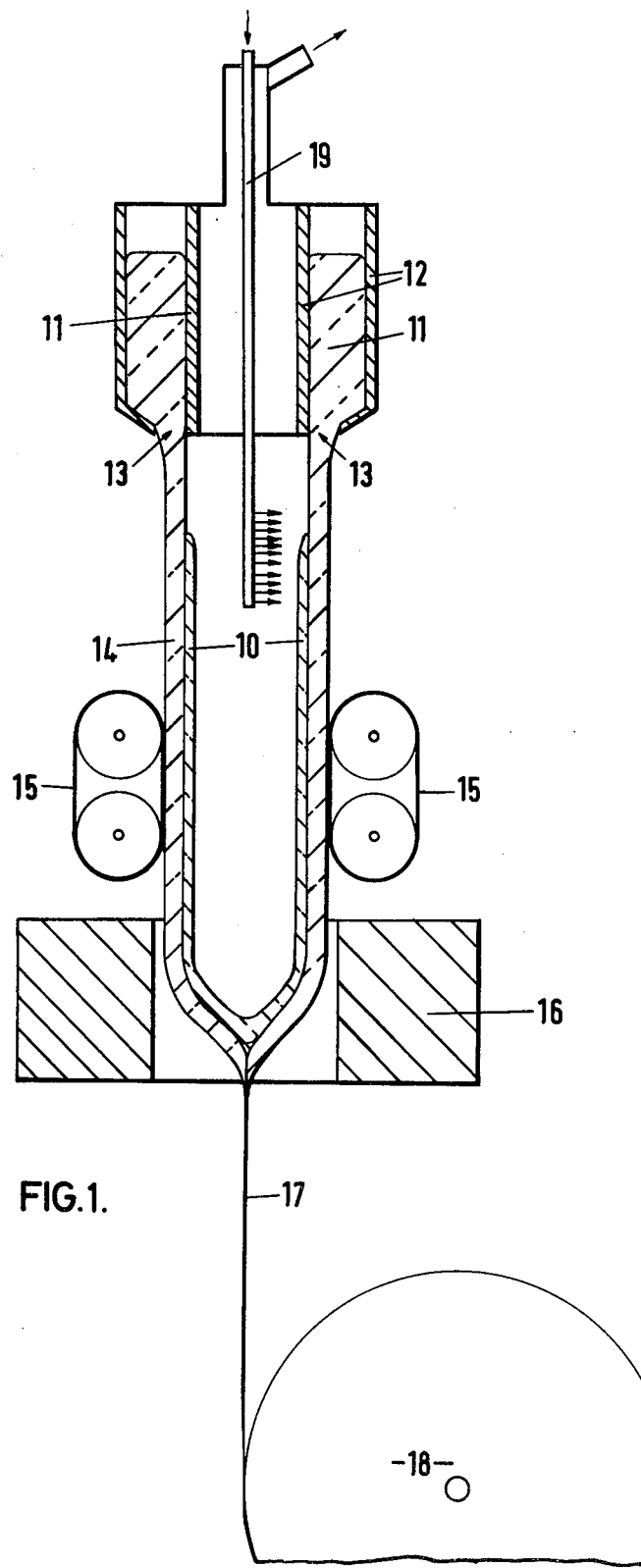
FIG. 1 depicts a schematic view of the apparatus in vertical section.

In the apparatus of FIG. 1 a melt 11 of glass is contained in a vessel 12 provided with an annular orifice 13 from which glass tubing 14 is pulled by being pinched between a pair of driven endless belts 15. If the vessel 12 is made of platinum the melt may be heated by resistance heating of the vessel. Alternatively, the necessary heat may be provided from some other heat source (not shown). The tubing 14 descends into a furnace 16 where its bore is collapsed by surface tension effects which can be controlled by temperature, pressure and feed rates. It is then drawn into fibre 17 by the tension provided by the drive applied to a capstan or take-up drum 18. Threading the vessel 12 is a gas feed 19 through which vapour reagents are passed to emerge at a distance above the point of collapse of the tube bore. The reagents react to produce either a layer 10 of vitreous or amorphous glass, or a material that will transform under the effect of heat into such a glass, on the bore of the tube which is then incorporated into the centre of the fibre.

Figure 2:
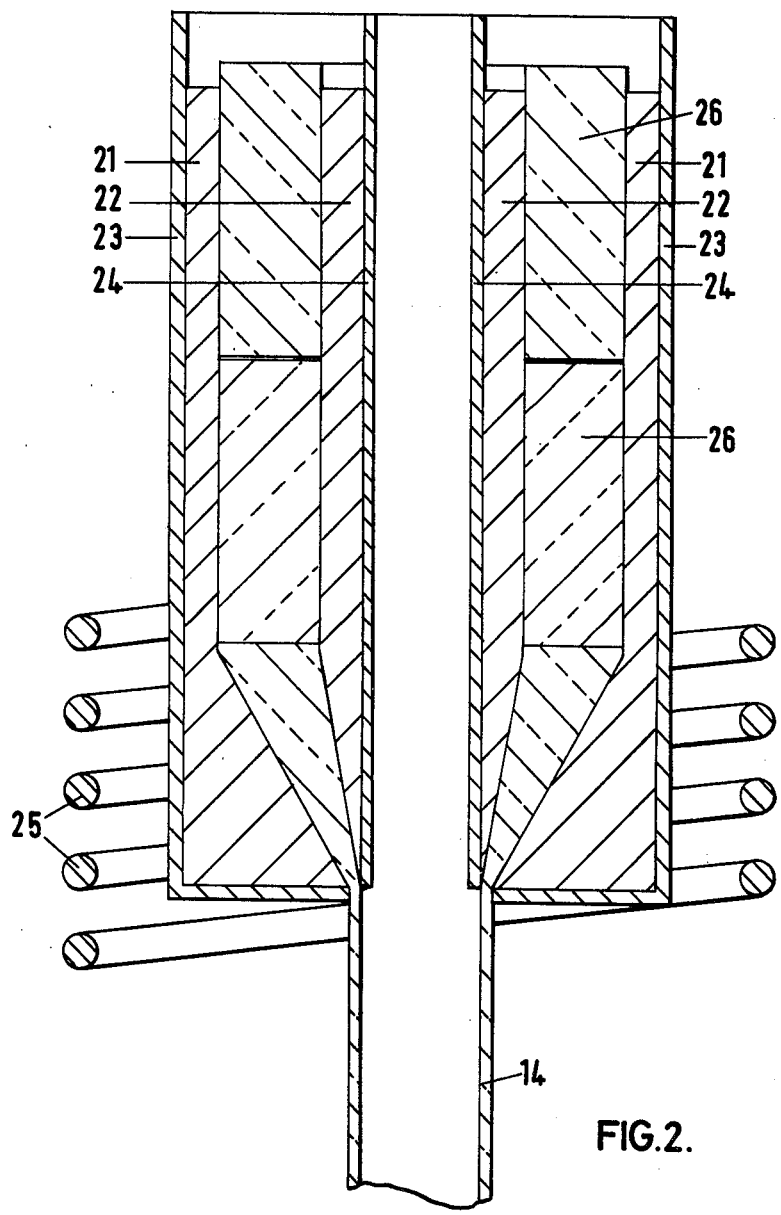
FIG. 2 depicts a schematic view of extrusion apparatus which may be used in place of the melt containing vessel of FIG. 1 for making glass tubing.

Some glasses, such as fused silica, are so refractory that it is virtually, if not completely impossible, to prepare tubing of these glasses from a melt because of the difficulty of finding a suitable material from which to make the containing vessel. In order to make tubing of those materials the vessel 12 of FIG. 1 may be replaced with extrusion apparatus of the type depicted in FIG. 2. This extrusion apparatus consists essentially of two induction heated graphite dies 21 and 22 located in stabilised zirconia liners 23 and 24, and heated by an induction coil 25. The space between the graphite dies is loaded with billets 26 of glass, typically fused silica. The apparatus is heated to a temperature that is insufficient to melt the billets but is sufficient to soften them enough for them to coalesce and deform. At this temperature the glass extrudes out of the bottom of the apparatus as tubing. Since the gas feed 19 has to thread this apparatus it is not possible for the apparatus to be operated on a continuous flow basis using tubular billets because these can not be introduced around the feed without interrupting it. For this reason it is preferred to use billets that are not themselves tubes but which pack together in groups to form tubes. A commercially available continuous tube drawing furnace can be modified for use in this process.

The type of vapour deposition reaction that may be used can be a hydrolysis reaction, but where the material of the tubing is sufficiently refractory, as is the case when silica tubing is used, it is generally preferred to use an oxidation reaction. This is because hydrogen and hydrogen containing compounds can be excluded from such a reaction, and thus preclude the formation of water vapour which is detrimental to optical transmissivity if incorporated into the deposit as —OH groups. The gas feed 19 is preferably water cooled, is rotated, and at its outlet is provided with one or more jets directed towards the wall of the tubing 14. In the most simple form of apparatus the gas feed has only one mixture of vapours supplied to it in which case the mixture is such as to produce a glass deposit of higher refractive index then that of the tubing 14. This glass forms the core of a step index fibre while the tubing forms the cladding. In apparatus where there are two or more jets supplied from separate ducts in the gas feed with different mixtures of vapours, these jets are located at different heights in order to produce a layered deposit in which the composition is graded from material derived from the top jet at the outermost portion of the deposit to material derived from the bottom jet at the innermost. Such an arrangement can be used to build up simple step index fibre in which both the core and the cladding are provided by vapour deposited material. This is a significant advantage in that it allows the tubing to be made of poor optical quality material. More complicated step index structures of optical fibre can also be made with the apparatus, such as W-guide. Furthermore, with a multi-feed arrangement it is possible to make graded index structures.

Preferred reagents for making fibre in silica tubing are silicon tetrachloride, germanium tetrachloride, boron tribromide, and oxygen. To produce graded index fibre, the topmost jet or jets are supplied with a mixture to produce the lowest index deposit. This deposit is formed as the product of a halide oxidation reaction which proceeds at a high temperature promoted by a furnace (not shown) surrounding the tubing 14 in the region of the jets. If the endless belt drive is located above the deposition zone, this furnace may be an extension of the furnace 16 that is required to soften the coated tubing sufficiently for drawing. The deposition reaction proceeds satisfactorily at a lower temperature than that required for drawing, and the deposition reaction temperatures for depositing pure silica is somewhat lowered by the inclusion of other halide vapours, such as germanium tetrachloride. For this reason, in order to provide comparable deposition rates and conditions for both high and low refractive index material, it is generally preferred to include boron trichloride together with silicon tetrachloride and oxygen in the vapour mixture used for making the low index material. The deposition product is silica doped with boric oxide. The boric oxide doping produces a glass with a refractive index slightly less than that of pure silica. Successively lower jets are supplied with vapour mixtures including silicon tetrachloride and oxygen, together with progressively increased proportions of germanium tetrachloride, and optionally progressively reduced proportions of boron trichloride. The germanium tetrachloride produces germania doping in the silica deposition product, and this has the effect of increasing its refractive index. Other dopants, particularly phosphorus pentoxide, but also including alumina, and antimony trioxide, may be used in place of or together with, germania as refractive index increasing dopants. In the case of phosphorus pentoxide doping, the dopant is preferably provided by the inclusion of phosphorus oxychloride into the vapour mixture.

It is to be understood that the foregoing description of specific examples of this invention is made by way of example only and is not to be considered as a limitation on its scope.

We claim:

1. A method of optical fibre manufacture, comprising the steps of:
    fabricating a glass tube around a vertical gas feed;
    lowering the glass tube through a hot zone where it is softened and its bore collapsed;
    drawing the collapsed tube into an optical fibre; and
    discharging vapor deposition reagents into the glass tube through the vertical gas feed in a zone above the region where the tube is collapsed, thereby depositing upon the bore one or more layers of reagents, the composition of which is chosen to provide the drawn fibre with optical waveguiding properties.

2. A method as claimed in claim 1 wherein the material deposited on the tubing bore is deposited as a glass.

3. A method as claimed in claim 1 wherein the gas feed is rotatable about its axis.

4. A method as claimed in claim 1, wherein the gas feed is water cooled.

5. A method as claimed in claim 1, wherein the gas feed is provided with a plurality of ducts supplying a plurality of outlet jets with different vapour mixtures.

6. A method as claimed in claim 1 wherein the layer or layers are deposited by a hydrolysis reaction.

7. A method as claimed in claim 1, wherein the layer or layers are deposited by an oxidation reaction from which hydrogen and hydrogen containing compounds are excluded.

8. A method as claimed in claim 1 wherein the tubing is made of fused silica.

9. A method as claimed in claim 8 wherein the deposit includes at least one layer of doped silica.

10. A method as claimed in claim 9 wherein the deposit includes at least one doped silica layer whose dopant includes germania.

11. A method as claimed in claim 9 wherein the deposit includes at least one doped silica layer whose dopant includes boric oxide.

12. A method as claimed in claim 9, wherein the deposit includes at least one doped silica layer whose dopant includes phosphorus pentoxide.

13. A method as claimed in claim 1 wherein the glass tubing is fabricated around the gas feed from glass billets that are not themselves tubes but which pack together in groups to form tubes, which billets are heated in extrusion apparatus to cause them to fuse together.

* * * * *